United States Patent
Kuji et al.

(10) Patent No.: US 6,840,973 B2
(45) Date of Patent: Jan. 11, 2005

(54) AIR CLEANER FOR COMBUSTION ENGINE

(75) Inventors: Yasuhiro Kuji, Kobe (JP); Isamu Nishikawa, Akashi (JP); Yuichi Kawamoto, Akashi (JP); Kouji Watanabe, Kashihara (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 18 days.

(21) Appl. No.: 10/428,544

(22) Filed: May 2, 2003

(65) Prior Publication Data

US 2004/0187453 A1 Sep. 30, 2004

(51) Int. Cl.$^7$ .......................... B01D 27/06; B01D 29/17; B01D 46/02
(52) U.S. Cl. .................... 55/385.3; 55/502; 55/509; 55/510; 55/DIG. 42
(58) Field of Search ................ 55/385.3, 486, 55/487, 495, 497–499, 501, 502, 504, 509, 510, DIG. 42; 210/446, 450, 452, 455, 489, 490, 494.1, 496, 498

(56) References Cited

U.S. PATENT DOCUMENTS

| | | | | |
|---|---|---|---|---|
| 2,966,960 A | * | 1/1961 | Rochlin | 55/502 |
| 3,056,501 A | * | 10/1962 | Thorman et al. | 210/132 |
| 3,413,782 A | * | 12/1968 | Bartlett | 55/485 |
| 3,766,629 A | * | 10/1973 | Lechtenberg | 29/412 |
| 4,178,161 A | * | 12/1979 | Rudner et al. | 55/524 |
| 4,233,043 A | * | 11/1980 | Catterson | 55/315 |
| 4,280,582 A | * | 7/1981 | Kouyama et al. | 180/219 |
| 4,402,827 A | * | 9/1983 | Joseph | 210/314 |
| 4,509,613 A | * | 4/1985 | Yamaguchi | 180/219 |
| 4,588,426 A | * | 5/1986 | Virgille et al. | 55/337 |
| 4,600,418 A | * | 7/1986 | Gommel et al. | 55/462 |
| 4,826,598 A | * | 5/1989 | Cain | 210/445 |
| 4,838,909 A | * | 6/1989 | Bidanset | 55/385.7 |
| 4,906,265 A | * | 3/1990 | Berfield | 55/379 |
| 5,503,649 A | * | 4/1996 | Nickel | 55/321 |
| 6,235,073 B1 | * | 5/2001 | Bannister et al. | 55/385.3 |
| 6,251,151 B1 | * | 6/2001 | Kobayashi et al. | 55/309 |
| 6,293,983 B1 | * | 9/2001 | More | 55/486 |
| 6,296,691 B1 | * | 10/2001 | Gidumal | 96/17 |

(List continued on next page.)

FOREIGN PATENT DOCUMENTS

| | | |
|---|---|---|
| JP | 63-215866 | 9/1988 |
| JP | 64-015760 | 1/1989 |
| JP | 02-107756 | 8/1990 |
| JP | 03-110166 | 11/1991 |

OTHER PUBLICATIONS

Applicant's comments in English are provided for documents 1,2 & 4.

*Primary Examiner*—Robert H. Spitzer

(57) ABSTRACT

An air cleaner is provided which is effective to retain a cleaner element 3 in a heteromorphic shape and which has an increased cleaning capability and an assemblability. The air cleaner includes a cleaner element 3 made of a urethane foam and formed in a tubular form having an endless wall and operable to pass an air therethrough in a direction across the thickness of the cleaner element to purify the air. The cleaner element 3 when viewed from top represents a heteromorphic shape, and first and second retainer plates 7 and 8 made of an elastic material effective to retain the heteromorphic shape of the wall, which plates 7 and 8 are bonded to upper and lower end faces of the cleaner element 3. The cleaner element 3 together with the first and second retainer plates 7 and 8 is carried by a holder assembly 4 and is accommodated within a cleaner housing 1 together with the holder assembly 4. The holder assembly 4 includes a first holder having a seat element for holding the upper end face of the cleaner element 3 through the first retainer plate 7 and a second holder 6 having a seat element 61 for holding the lower end face of the cleaner element 3 through the second retainer plate 8.

15 Claims, 5 Drawing Sheets

U.S. PATENT DOCUMENTS

| | | | |
|---|---|---|---|
| 6,355,077 B1 * | 3/2002 | Chittenden et al. | 55/385.3 |
| 6,478,105 B2 * | 11/2002 | Okuma | 180/219 |
| 6,736,871 B1 * | 5/2004 | Green et al. | 55/385.3 |
| 2001/0025471 A1 * | 10/2001 | Fries et al. | 55/320 |
| 2001/0039882 A1 * | 11/2001 | Brun | 96/222 |
| 2002/0029549 A1 * | 3/2002 | Baumann et al. | 55/385.3 |
| 2002/0069624 A1 * | 6/2002 | Jaramillo et al. | 55/385.3 |
| 2002/0088214 A1 * | 7/2002 | Sherwood | 55/486 |
| 2002/0100262 A1 * | 8/2002 | Gieseke et al. | 55/385.3 |

\* cited by examiner

AIR CLEANER FOR COMBUSTION ENGINE

BACKGROUND OF THE INVENTION

1. Field of the Invention

The present invention generally relates to an air cleaner and, more particularly, to the air cleaner for use with a motorcycle or the like for substantially purifying air being sucked into an internal combustion engine.

2. Description of the Prior Art

The air cleaner is generally of such a structure as shown in FIG. 6 which illustrates a conventional air cleaner in a side view with a portion cut out. Referring to FIG. 6, the illustrated air cleaner includes a cleaner housing 81, a filter holder 82 disposed within the cleaner housing 81, and an air cleaner element 83 retained by the filter holder 82. The cleaner housing 81 has an air intake port 84 and an air outlet port. An air A introduced into the cleaner housing 81 through the air intake port 84 passes through the cleaner element 83 which serves to remove a dust in the air. The air purified by the cleaner element 83 subsequently enters the engine (not shown) through the air outlet port.

As one of available materials for the cleaner element 83, an urethane foam is largely employed, which is inexpensive and easy to handle and having a high gas permeability. It has, however, been found that the cleaner element 83 made of the urethane foam is so soft as to induce a deformation. Therefore, the cleaner element 83 generally has such a simple sectional shape, for example, a square, round, elliptical or oval sectional shape, when viewed from top, that the cleaner element 83 can be easily held taut. As such, the cleaner element 83 can hardly be formed by a complicated sectional shape enough to allow a volume thereof to increase, when the air cleaner is formed by a complicated shape for avoiding an interference with surrounding parts around the cleaner.

Also, the filter holder 82 is consist of a first holder element 82a for retaining the cleaner element 83, and a second holder element 82b positioned on one side of the first holder element 82a opposite to the cleaner element 83 and connected with the first holder element 82a by means of a fastening element 85 such as, for example, a bolt. When the first and second holder elements 82a and 82b are connected together, a sealing member 86 made of an urethane foam is interposed between the cleaner element 83 and the second holder element 82b to ensure that the air A upstream of the filter element 83 with respect to the direction of flow thereof towards the air outlet port can pass through the filter element 83. However, since in this structure the cleaner element 83 and the first holder element 82a is held in direct contact with the sealing member 86 at one end of the first holder element 82a whose width is narrow, the sealing member 86 made of an urethane foam tends to quickly loose its own resiliency, resulting in decrease of the sealability. Therefore, there is a possibility that the dirt may enter the inside of the filter holder 82 through a gap between the sealing member 86 and the second holder element 82b. Also, since the sealing member 86 is bonded to the cleaner element 83, a replacement of the sealing member 86 requires a replacement of the cleaner element 83 and, therefore, the cleaner element 83 as a whole has a lifetime governed by the lifetime of the sealing member 83.

SUMMARY OF THE INVENTION

In view of the foregoing, the present invention has for its object to provide an improved air cleaner in which a cleaner element made of a soft material such as an urethane foam can retain its predetermined or required shape and can have an enhanced air cleaning capability.

In order to accomplish the foregoing object, the present invention in accordance with one aspect thereof provides an air cleaner for an engine for purifying air to be introduced into the engine, said air cleaner comprising a cleaner housing, a cleaner element, first and second retainer plates and a holder assembly. The cleaner element is made of a urethane foam and formed in a tubular form having an endless wall and operable to pass the air therethrough in a direction across a thickness of the cleaner element to purify the air, said cleaner element, when viewed in a direction conforming to a heightwise direction of the wall, represents a heteromorphic shape and has upper and lower end faces opposite to each other. Each of the first and second retainer plates is made of an elastic material and bonded respectively to the upper and lower end faces of the wall to retain the heteromorphic shape of the wall. The holder assembly includes a first holder member having a first seat element for holding the upper end face of the cleaner element through the first retainer plate and a second holder member having a second seat element for holding the lower end face of the cleaner element through the second retainer plate. Said cleaner element and said first and second retainer plates are carried by the holder assembly and accommodated within the cleaner housing together with the holder assembly.

The term "heteromorphic shape" referred to hereinabove and hereinafter is to be understood as any two-dimensional shape other than round, elliptical, oval and regular polygonal shapes.

According to the above described aspect of the present invention, since the cleaner element is formed to represent the heteromorphic shape, the cleaner element of a relatively large size can be installed while making a maximized utilization of the space available for the air cleaner while avoiding any possible interference with peripheral machine components around the air cleaner. Accordingly, the surface area of the cleaner element through which the air to be cleaned passes can advantageously be increased to thereby increase the cleaning capacity. Also, since the peculiar heteromorphic shape of the cleaner element can be retained by the retainer plates bonded respectively to the upper and lower end faces of the cleaner element, the deformation in shape of the cleaner element even though made of a urethane foam is prevented effectively by the retainer plate, resulting advantageously in increase of the assemblability and an inexpensive and simplified structure.

The present invention in accordance with another aspect thereof also provides an air cleaner for an engine for purifying air to be introduced into the engine, said air cleaner comprising a cleaner housing, a cleaner element, a retainer plate, a holder assembly and a sealing member. The cleaner element is formed in a tubular form having an endless wall and operable to pass the air therethrough in a direction across a thickness of the cleaner element to purify the air, said cleaner element has upper and lower end faces opposite to each other. The retainer plate is made of an elastic material and bonded to at least one of the upper and lower end faces of the wall. The holder assembly is for holding the cleaner element, said cleaner element is accommodated within the cleaner housing together with the holder assembly. The sealing member is disposed in the holder assembly and sandwiched between the retainer plate and a seat element which holds said at least one of the upper and lower end faces of the cleaner element through the retainer plate.

According to such another aspect of the present invention, since the cleaner element can be retained to a predetermined shape by means of the retainer plates bonded respectively to the upper and/or lower end faces of the cleaner element, formation of the cleaner element to a heteromorphic shape effective to achieve a maximized utilization of a space available for the air cleaner is effective to increase the cleaning capability by increasing the surface area of the cleaner element through which the air to be cleaned passes, even though the cleaner element is of an inexpensive and simplified structure. Also, in this structural feature, the retainer plate is fitted to the cleaner element and, on the other hand, the holder assembly is provided with the seat element for receiving the retainer plate bonded to such at least one of the upper and lower end faces of the wall. Accordingly the sealing member sandwiched between the retainer plate and the seat element of the holder assembly does not directly contact the narrow end portion of the holder assembly such as observed in the conventional air cleaner. Avoidance of the direct contact between the sealing member and the narrow end portion of the holder assembly is effective to avoid a permanent set of the sealing member which would result from fatigue and, hence, to enhance the sealing capability.

Moreover, as the elastic material for the retainer plate, any material more robust against the fatigue-induced permanent set than any urethane foam can be employed and, therefore, the need to replace the cleaner element and the retainer plate bonded thereto at an early stage can be eliminated to allow the cleaner element to be used for a prolonged period of time.

In a preferred embodiment of the present invention, each of the retainer plate and the sealing member may be made of a rubber material. The use of the rubber material allows the sealing member to have a prolonged lifetime while exhibiting a high sealing capability and, hence, the cleaner element to which the sealing member is bonded can have a prolonged lifetime.

In another preferred embodiment of the present invention, the sealing member may be engaged in a groove formed in the holder assembly.

BRIEF DESCRIPTION OF THE DRAWINGS

In any event, the present invention will become more clearly understood from the following description of preferred embodiments thereof, when taken in conjuction with the accompanying drawings. However, the embodiments and the drawing are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
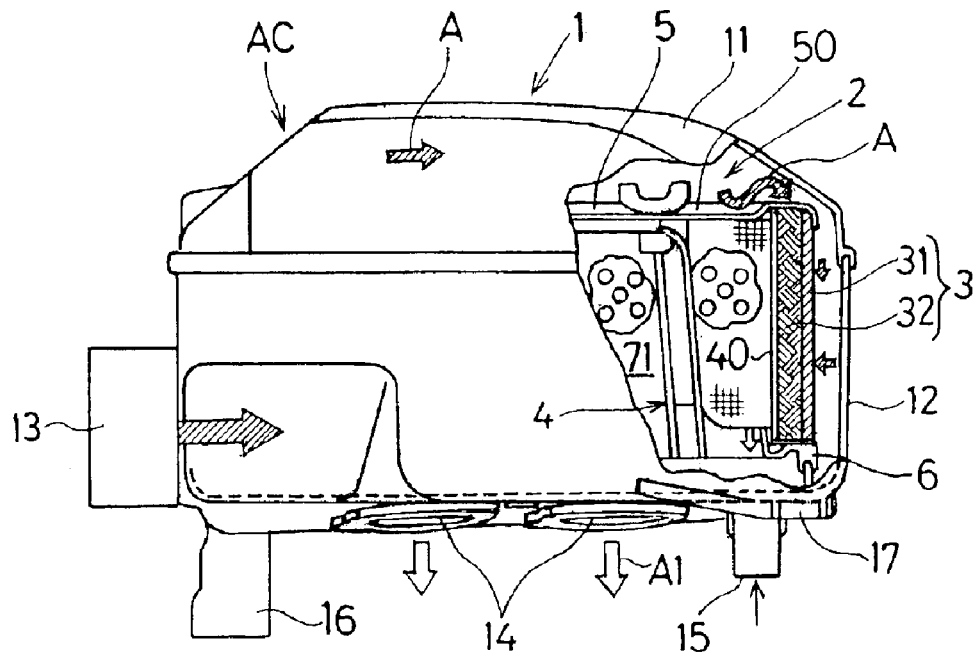
FIG. 1 is a side view, with a portion cut out, of an air cleaner according to a first preferred embodiment of the present invention.
Figure 2:
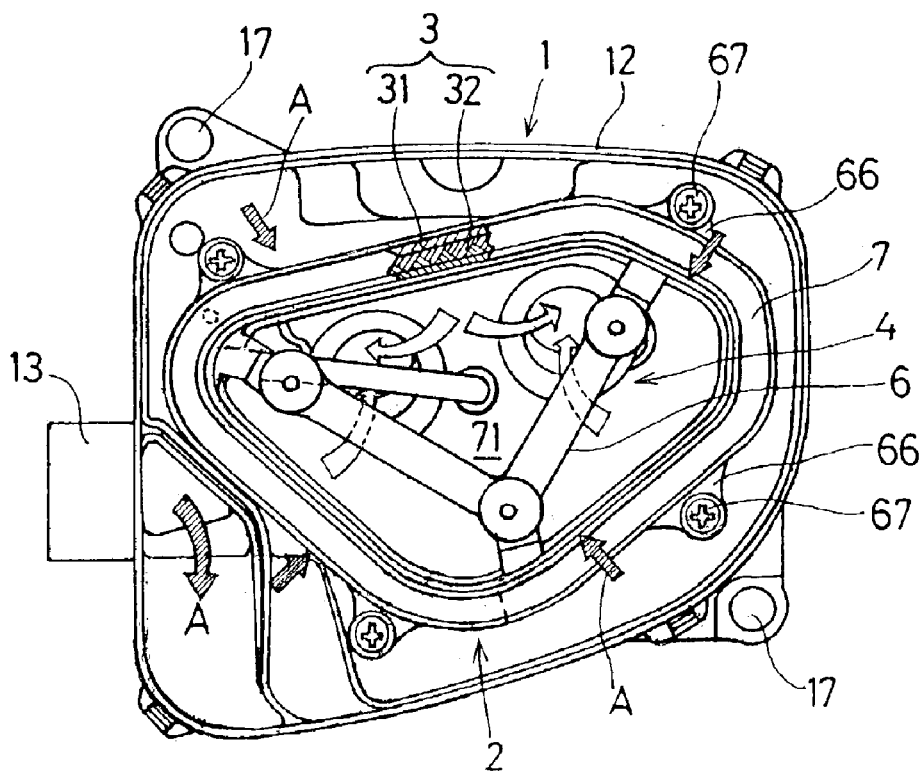
FIG. 2 is a top plan view of the air cleaner with a cleaner hood and a first holder element removed.

Hereinafter, an air cleaner according to a first preferred embodiment of the present invention will be described with reference to FIGS. 1 to 4, wherein FIGS. 1 and 2 show a side view, with a portion cut out, of the air cleaner and a top plan view of the air cleaner with some of the component parts removed, respectively. The air cleaner AC shown in FIG. 1 includes a cleaner housing 1 and a cleaner element assembly 2 encased within the cleaner housing 1. The cleaner housing 1 is made of a generally cap-shaped cleaner hood 11 and a generally cup-shaped cleaner container 12 positioned below and fixed together with the cleaner hood 11. The cleaner container 12 has an air intake port 13 for receiving outside air A to be cleaned and an air outlet port 14 from which the air having been substantially purified enters an air intake system of an internal combustion engine (not shown). The cleaner container 12 also has defined therein a coupling port 15 for fluid connection with a breather pipe (not shown) leading to the combustion engine, a coupling port 16 for fluid connection with a drain pipe (not shown) and two or more connecting lugs 17 for fixedly mounting the air cleaner AC to a vehicle frame (not shown) of, for example, a motorcycle by means of corresponding bolts.

Figure 4:
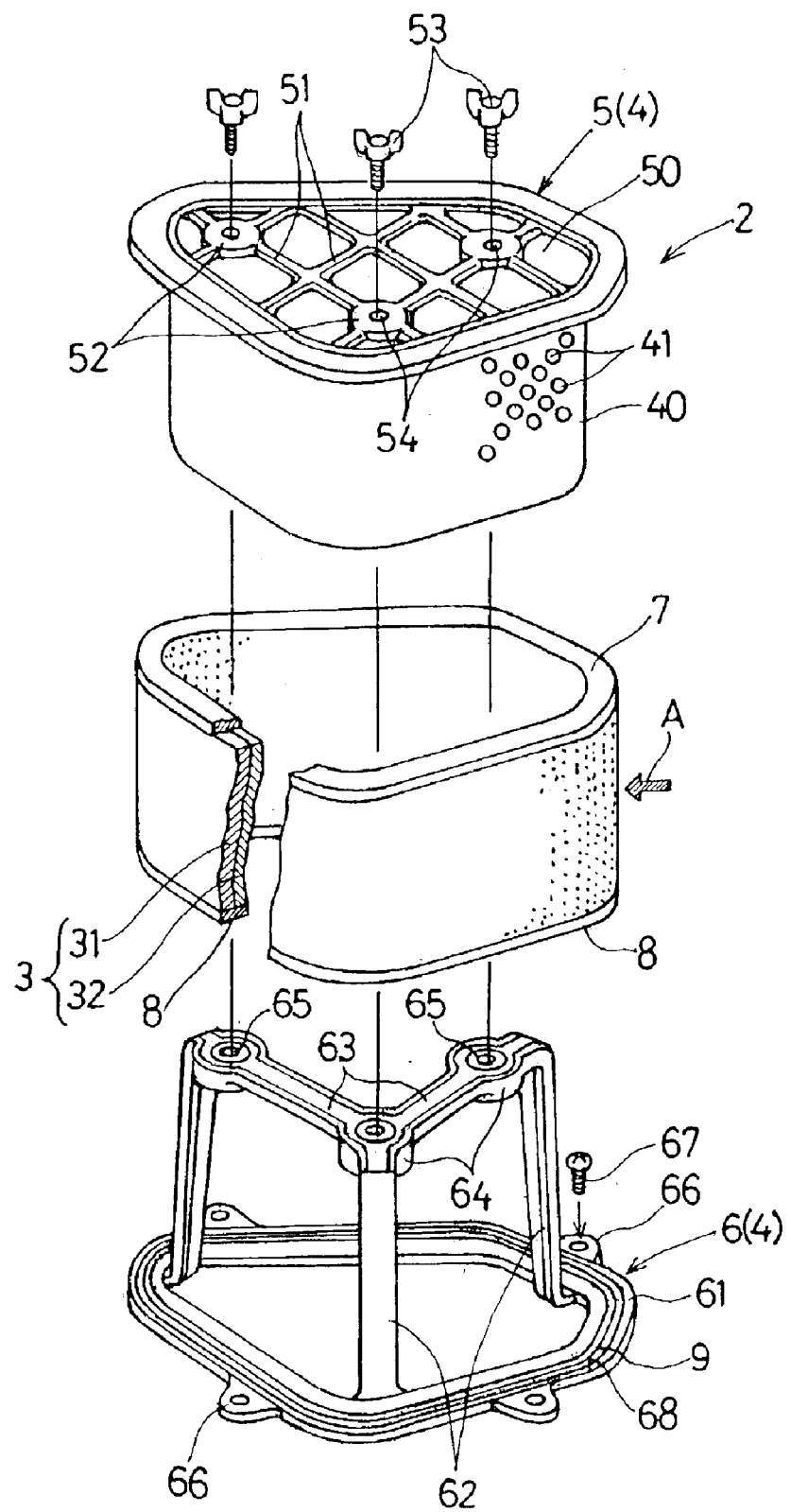
FIG. 4 is an exploded view of the cleaner element assembly.

The cleaner element assembly 2 includes, as shown in an exploded view in FIG. 4, a cleaner element 3 shaped in a generally tubular or barrel form having an endless wall and operable to remove dusts in the air A as the air A passes therethrough in a direction across the thickness of the cleaner element 3, and a holder assembly 4 for retaining the cleaner element 3. The holder assembly 4 includes a first holder 5 provided integrally with a tubular body 40 onto which the cleaner element 3 is mounted, and a second holder 6 for retaining the cleaner element 3 between it and the first holder 5 while the cleaner element 3 is mounted externally around the tubular body 40.

The cleaner element 3 is, as shown in FIG. 4, so shaped as to represent a heteromorphic shape (a shape other than round, elliptical, oval and regular polygonal shapes) in plan view, that is, when viewed in a direction conforming to the heightwise direction of the wall and has its upper and lower end faces to which first and second retainer plates 7 and 8 are fitted. Each of the first and second retainer plates 7 and 8 is effective to retain the heteromorphic shape of the wall. In the illustrated embodiment, the cleaner element 3 is of a double layered structure including a first cleaner layer 31 of a heteromorphic shape made of an urethane form having a relatively coarse mesh, and a second cleaner layer 32 of an equally heteromorphic shape made of an urethane foam having a relatively fine mesh, with the second cleaner layer 32 positioned inside and overlapped with the first cleaner layer 31. It is, however, to be noted that the cleaner element 3 may be of a single layered structure.

The first and second cleaner layers 31 and 32 are bonded at their upper and lower end faces to the first and second retainer plates 7 and 8 each being in the form of a thin-walled plate shape to conform to the heteromorphic shape of the upper and lower end of the cleaner element 3. Each of the first and second retainer plates 7 and 8 is made of an elastic material, preferably rubber, which is effective to retain the heteromorphic shape of the corresponding upper and lower end of the cleaner element 3 which is also effective to provide a high sealability when the cleaner element 3 is to be sealed by the utilization of the retainer plates 7 and 8.

Figure 3:
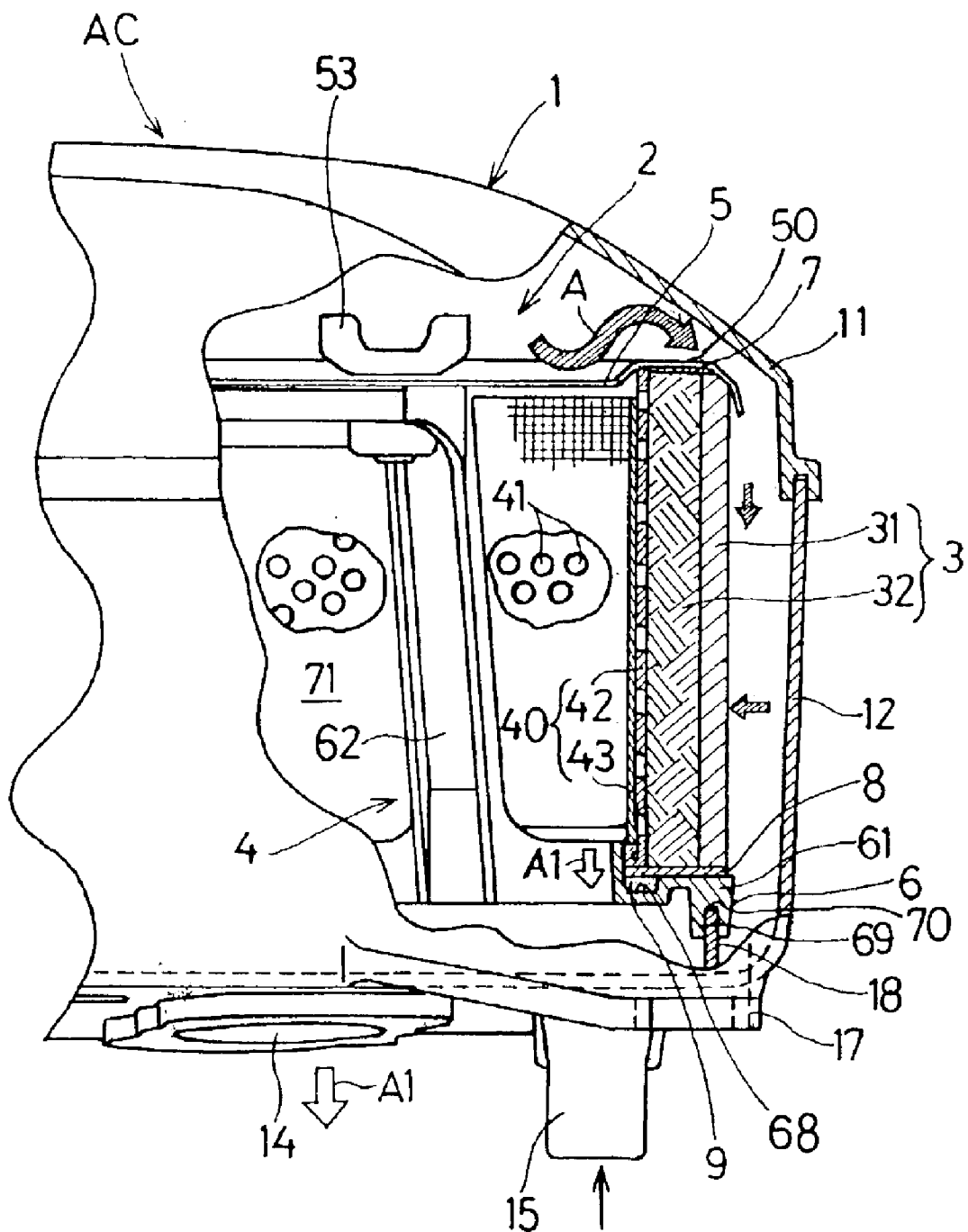
FIG. 3 is a fragmentary side view, on an enlarged scale and with a portion cut out, of the air cleaner, showing the details of a cleaner element assembly.

The tubular body 40 onto which the cleaner element 3 is mounted as described above is formed to have a sectional shape similar to the heteromorphic shape of the cleaner element 3 and includes a punched plate 42 made of, for example, a metallic material and having a multiplicity of round holes 41 defined therein, and a fine mesh wire gauze 43 as shown in FIG. 3.

The first holder 5 referred to above has a cover 50 prepared from a metallic plate and covering an entire top area including the first retainer plate 7 of the cleaner element 3, and the tubular body 40 is rigidly connected to an undersurface of the cover 50 by means of a welding technique. The cover 50 of the first holder 5 is formed with a plurality of round bosses 52 on the top surface thereof as best shown in FIG. 4 and each having a through hole 54 defined therein for receiving a respective thumb screw 53. Also, this cover 50 has its top surface formed with a matrix pattern of reinforcement ribs 51 for reinforcing the round bosses 52 each defined at a point of intersection of the reinforcement ribs 51. As shown in FIG. 3, the first holder 5 having the cleaner element 3 mounted thereonto is combined together with the second holder 6 by means of the thumb screws 53 to thereby complete the cleaner element assembly 2. An outer peripheral portion of the cover 50 of the first holder 5 defines a seat for retaining the upper end face of the cleaner element 3 through the first retainer plate 7.

The second holder 6 is made of a synthetic resin and includes a support frame 61 of a heteromorphic shape identical with the sectional shape of the cleaner element 3 and defining a seat element for receiving the lower end face of the cleaner element 3 through the second retainer plate 8, a plurality of support legs 62 protruding upwardly from the support frame 61 and connecting webs 63 each connecting upper ends of the support legs 62. The connecting webs 63 have respective bosses 64 into which nuts 65 engageable with the associated thumb screws 53 are fixedly embedded.

For enabling the support frame 61 to be fitted to the cleaner housing 1, the support frame 61 has a plurality of spaced mounting lugs 66 on outer periphery thereof, and as shown in FIG. 2 the mounting lugs 66 are fastened to a bottom wall of the cleaner container 12 by means of bolts 67 so that the cleaner element assembly 2 can be mounted within the container 12. Also, as shown in FIG. 3, a peripheral portion of the bottom wall of the cleaner container 12 is formed with a protrusion 18 that protrudes upwardly within the cleaner container 12 and, on the other hand, a peripheral portion of an undersurface of the support frame 61 of the second holder 6 is formed with a groove 69 for engagement with the protrusion 18 rigid with the bottom wall of the cleaner container 12. A sealing ring 70 is mounted in the groove 69 in the support frame 61 and, accordingly, it is clear that when the cleaner element assembly 2 is mounted inside the cleaner container 12 with the protrusion 18 engaged in the groove 69, a tight seal can be defined by the sealing ring 70 between the cleaner element assembly 2 and the cleaner container 12.

Referring still to FIG. 3, an annular sealing member 9 made of, for example, rubber material is sandwiched between the second retainer plate 8, fitted to the lower end face of the cleaner element 3, and the support frame (seat element) 61 of the second holder 6 to seal the inside of the cleaner element assembly 2 off from the outside of the cleaner element assembly 2 except for a portion occupied by the cleaner element 3. Accordingly, it will readily be seen that the air to be cleaned can be positively guided so as to pass through the cleaner element 3 to thereby substantially purify the air. In other words, by forming a peripheral groove 68 in an outer peripheral portion of the support frame 61, then inserting the sealing member 6 in the peripheral groove 68 and finally allowing the second retainer plate 8 to contact an upper surface portion of the sealing member 9, a tight seal can be formed between the cleaner element 3 and the second holder 6. The sealing member 9 referred to above is disposed in the support frame (seating element) 61 of the second holder 6 at a position confronting the lower end face of the tubular body 40 of the first holder 5 through the second retainer plate 8.

The operation of the air cleaner AC of the structure hereinbefore described will now be described. The cleaner element 3 shown in FIG. 4 although having been formed of a flexible urethane foam to the heteromorphic shape will not deform in shape owing to the retainer plates 7 and 8 secured to the upper and lower end faces of the cleaner element 3 and can therefore retain the predetermined shape, that is, the heteromorphic shape. Accordingly, mounting of the cleaner element 2 onto the first holder 5 is easy to achieve, resulting in increase of the assemblability. In addition, the use of the urethane foam as a material for the cleaner element 3 makes it possible to manufacture the cleaner element 3 of an inexpensive and simplified structure. Yet, mounting of the cleaner element 3 externally onto the tubular body 40 allows the heteromorphic shape to be firmly retained in the cleaner element 3. Thus, allowing the cleaner element 3 to retain the heteromorphic shape makes it possible for the cleaner element 3 of a large size enough to effectively utilize the space for the air cleaner AC to be installed, such that the surface area of the cleaner element 3 through which the air to be cleaned passes can advantageously be increased to thereby increase the cleaning capacity.

When the cleaner element assembly 2 is to be assembled, the set bolts 67 after having been passed through the mounting lugs 66 in the support frame 61 of the second holder 6 have to be firmly fastened into the bottom wall of the cleaner container 12 to thereby secure the second holder 6 to the cleaner container 12. Thereafter, the first holder 5 having the tubular body 40 around which the cleaner element 3 has been mounted is capped onto the second holder 6, followed by fastening of the thumb screws 53 into the corresponding nuts 65 in the second holder 6 through the through holes 54 in the first holder 5. In this way, the first and second holders 5 and 6 carrying the cleaner element 3 can be mounted within the cleaner housing 1. The first holder 5 and the second holder 6 may be connected intervening the cleaner element 3 between them to complete the cleaner element assembly 2 and then the cleaner assembly may fasten to the cleaner housing with the bolts 67.

As hereinabove described, with the air cleaner AC having the cleaner element assembly 2 mounted inside the cleaner housing 1, the air introduced into the cleaner housing 1 through the air intake port 13 flows from the interior of the cleaner container 12 towards a space within the cleaner hood 11 and above the cleaner element assembly 2 and then towards the outside of the cleaner element 3 in a direction shown by the arrow A in FIG. 3. The air flowing outside the cleaner element 3 subsequently passes through the cleaner element 3 in a direction across the thickness of the cleaner element 3 and the dust in the air removed by the cleaner element 3, and then flows into a purified air chamber 71 defined inwardly of the cleaner element 3 and the tubular body 40. The air so purified thereafter flows in a direction shown by the outline arrow A1 towards the engine air intake system (not shown) by way of the air outlet port 14 in the bottom wall of the cleaner container 12.

Considering that the annular sealing member 9 is sandwiched between the support frame 61 of the second holder 6 and the second retainer plate 8 secured to the lower end face of the cleaner element 3 as shown in FIG. 3, an ingress of the air A into the purified air chamber 71 through a gap which would be formed between the support frame 61 and the second retainer plate 8 is prevented. Accordingly, the air A to be cleaned can assuredly pass through the cleaner element 3 to remove the dirt from the air A.

Elimination of a possible direct contact of one narrow end of the holder assembly 4 with the sealing member 9 such as observed in the conventional air cleaner is effective to avoid a fatigue of the sealing member 9 to thereby ensure a high sealability.

Figure 5:
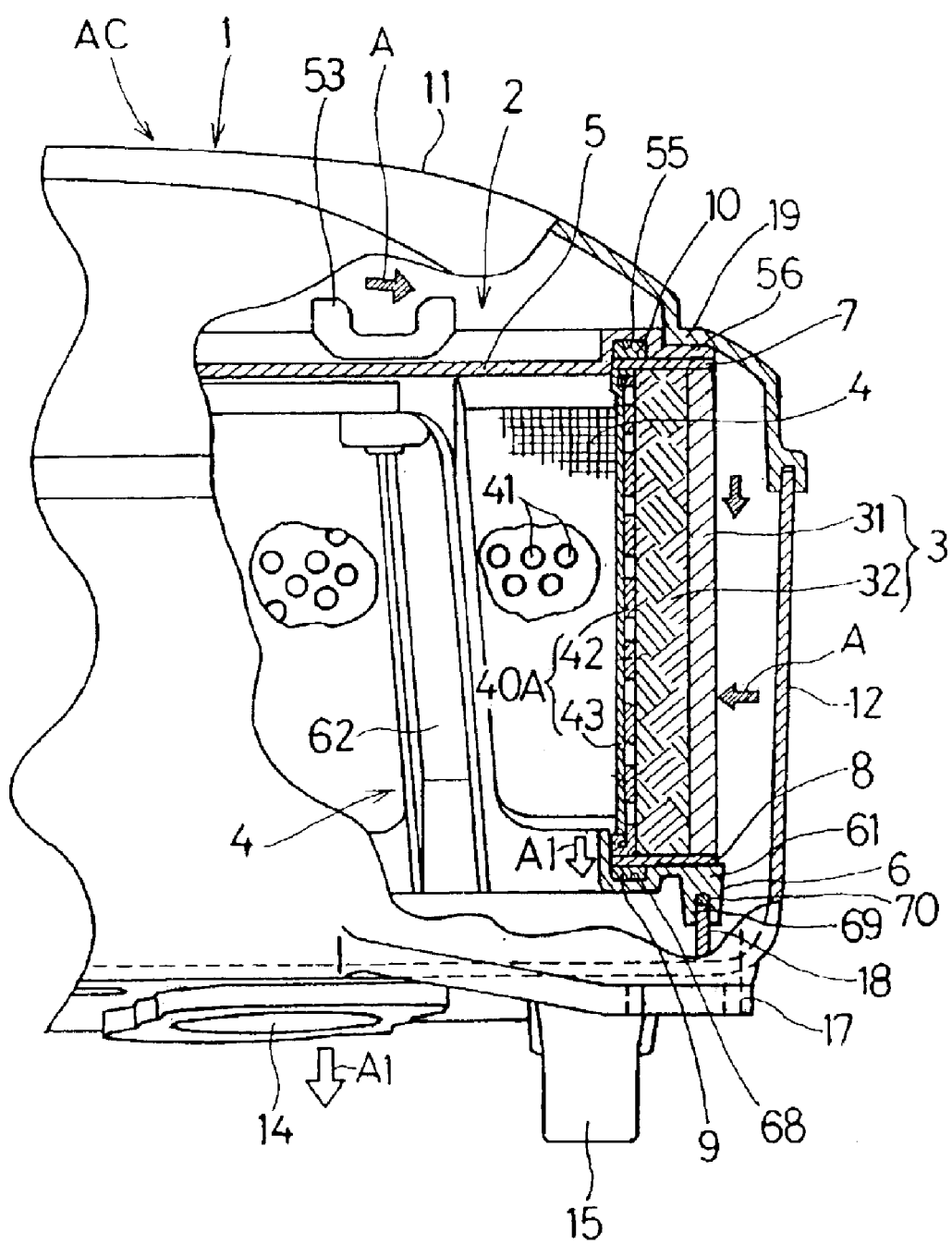
FIG. 5 is a view similar to FIG. 3, showing the air cleaner according to a second preferred embodiment of the present invention.
Figure 6:
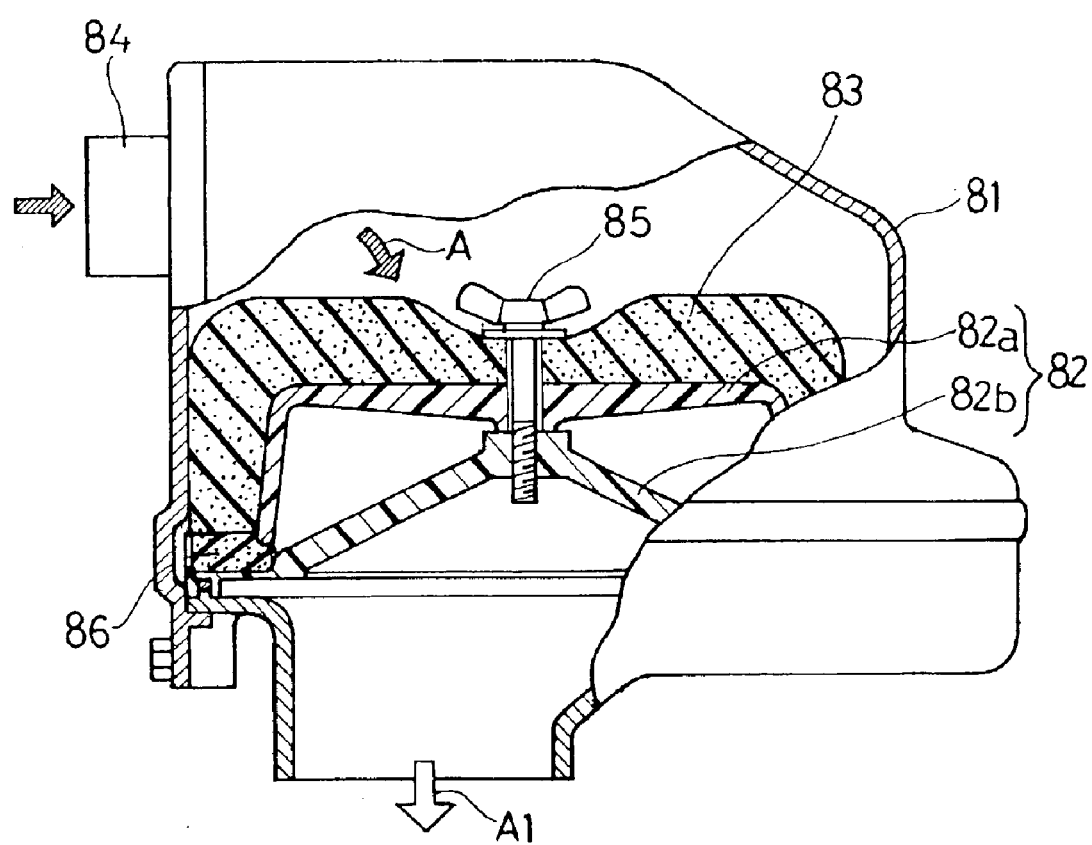
FIG. 6 is a schematic side view, with a portion cut out, of the conventional air cleaner.

FIG. 5 illustrates a second preferred embodiment of the present invention in a side view with a portion cut out. The air cleaner AC shown therein is substantially similar to that according to the previously described first embodiment, except that in FIG. 5 the first holder 5 is employed in the form of a cap made of a synthetic resin, in combination with a tubular body 40A separate from the first holder 5. The separate tubular body 40A is similar to the tubular body 40 employed in the first embodiment and is, hence, made up of a punched plate 42 and a fine mesh wire gauze 43. Thus, the holder assembly 4 employed in the air cleaner AC shown in FIG. 5 is of a three-piece structure including the first holder 5, the second holder 6 and the tubular body 40A. An outer peripheral portion of the first holder 5 defines a seat element 56 for receiving the upper end face of the cleaner element 3 through the first retainer plate 7 and, in the second embodiment, the sealing member 10 is sandwiched also between the first retainer plate 7 and the seat element 56 of the first holder 5. In other words, the first holder 5 has a peripheral groove 55 defined in a lower surface portion of an outer peripheral portion of the first holder 5 and an annular upper sealing member 10 is inserted into the peripheral groove 55 so that when the first retainer plate 7 secured to the upper end face of the cleaner element 3 is held in abutment with the sealing member 10, sealing can be achieved between an upper side of the cleaner element 3 and the first holder 5. It is to be noted that the sealing member 10 is disposed in the seat element 56 of the first holder 5 at a position confronting the upper end face of the tubular body 40A of the holder assembly 4 through the first retainer plate 7.

With respect to a lower side of the cleaner element 3, as is the case with that in the previously described first embodiment, an annular lower sealing member 9 is interposed and hence sandwiched between the second holder 6 and the second retainer plate 8 at the lower end face of the heteromorphic cleaner element 3 to thereby seal a gap between the lower side of the cleaner element 3 and the second holder 6. The annular lower sealing member 9 is disposed in the seat element 61 of the second holder 6 at a position confronting the lower end face of the tubular body 40A of the holder assembly 4 through the second retainer plate 8.

Also, in the second embodiment of the present invention, the cleaner hood 11 has an outer peripheral portion depressed at a plurality of, for example, three locations to define shoulders 19. The shoulders 19 serve to hold down an abutment 56 which is also a seat element of the first holder 5. The shoulders 19 are defined at a plurality of, for example, three, locations in an outer side of the peripheral groove 55 in the outer peripheral portion of the first holder 5 to thereby engage the protrusion 18, that is rigid with the cleaner container 12, with the groove 69 in the support frame 61 of the second holder 6 through the sealing ring 70 so that the cleaner element assembly 2 of the previously described structure can be connected between the cleaner hood 11 and the container 12.

In the air cleaner AC of the structure described above, the cleaner element 3 having the retainer plates 7 and 8 bonded to the upper and lower end faces thereof, respectively, is mounted around the tubular body 40A with the first and second holders 5 and 6 connected together while the cleaner element 3 intervenes between those holders 5 and 6 to thereby complete the cleaner element assembly 2. This cleaner element assembly 2 is subsequently mounted inside the cleaner housing 1. In doing so, the groove 69 at a lower portion of the cleaner element assembly 2 is engaged over the protrusion 18 rigid with the cleaner container 12 and the shoulders 19 formed in the cleaner hood 11 hold down the abutment 56 of the first holder 5, thereby completing mounting of the cleaner element assembly 2 in its entirety within the cleaner housing 1. By so doing, mounting of the cleaner element assembly 2 within the cleaner housing 1 can be accomplished merely by forming the shoulders 19 in the cleaner hood 11 as shown in FIG. 5, with no need to form the mounting flanges 66 in the support frame 61 of the second holder 6 and, also, no need to use the set bolts 67 for securing it to the cleaner container 12 such as required in the previously described first embodiment.

The second embodiment of the present invention has an additional advantage. Specifically, since the lower sealing member 9 is sandwiched between the second holder 6 and the second retainer plate 8 secured to the lower end face of the cleaner element 3 and, also, since the upper sealing member 10 is sandwiched between the first holder 5 and the first retainer plate 7 secured to the upper end face of the cleaner element 3, the lower and upper sealing members 9 and 10 are effective to allow the air A to be cleaned to positively pass through the cleaner element 3 to remove the dirt from the air A.

Elimination of respective direct contacts of the narrow ends of the holder assembly 4 with the sealing members 9 and 10, such as observed in the conventional air cleaner, is effective to prevent a fatigue of those sealing members 9 and 10 and, hence, to enhance the sealability.

In the practice of any one of the foregoing embodiments of the present invention, each of the first and second retainer plates 7 and 8 and the sealing members 9 and 10 is made of an elastic material and preferably a rubber material. The use of the elastic material, or the rubber material, for each of the members 7 to 10 is effective to increase the reliability of the sealing function afforded thereby. Also, for shape retention of the cleaner element 3, the retainer plates 7 and 8 may not be always employed, the first retainer plate 7, for example, can be dispensed with.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An air cleaner for an engine for purifying air to be introduced into the engine, said air cleaner comprising:
   a cleaner housing;
   a cleaner element made of a urethane foam and formed in a tubular form having an endless wall and operable to pass the air therethrough in a direction across a thickness of the cleaner element to purify the air, said cleaner element, when viewed in a direction conforming to a heightwise direction of the wall, representing a heteromorphic shape and having upper and lower end faces opposite to each other;
   first and second retainer plates each made of an elastic material and bonded respectively to the upper and lower end faces of the wall to retain the heteromorphic shape of the wall; and
   a holder assembly including a first holder member having a first seat element for holding the upper end face of the cleaner element through the first retainer plate and a second holder member having a second seat element for holding the lower end face of the cleaner element through the second retainer plate;
   said cleaner element and said first and second retainer plates being carried by the holder assembly and accommodated within the cleaner housing together with the holder assembly.

2. The air cleaner for an engine as claimed in claim 1, wherein the first holder integrally includes a tubular body onto which the cleaner element is externally mounted.

3. The air cleaner for an engine as claimed in claim 2, further comprising a sealing member sandwiched between the second seat element of the second holder and the second retainer plate.

4. The air cleaner for an engine as claimed in claim 3, each of the first and second retainer plates and the sealing member is made of a rubber material.

5. The air cleaner for an engine as claimed in claim 3, wherein the sealing member is disposed in the second seat element of the second holder at a location confronting a lower end face of the tubular body of the first holder through the second retainer plate.

6. The air cleaner for an engine as claimed in claim 5, wherein the second seat element of the second holder has a circumferentially extending groove defined therein and said sealing member is engaged in the circumferentially extending groove.

7. The air cleaner for an engine as claimed in claim 1, wherein the holder assembly includes a tubular body onto which the cleaner element is externally mounted and further comprising a first sealing member sandwiched between the first seat element of the first holder and the first retainer plate and a second sealing member sandwiched between the second seat element of the second holder and the second retainer plate, said tubular body intervening between the first and second retainer plates.

8. The air cleaner for an engine as claimed in claim 7, wherein the first sealing member is disposed in the first seat element of the first holder at a location confronting an upper end face of the tubular body through the first retainer plate and the second sealing member is disposed in the second seat element of the second holder at a location confronting a lower end face of the tubular body through the second retainer plate.

9. An air cleaner for an engine for purifying air to be introduced into the engine, said air cleaner comprising:
   a cleaner housing;
   a cleaner element formed in a tubular form having an endless wall and operable to pass the air therethrough in a direction across a thickness of the cleaner element to purify the air, said cleaner element having upper and lower end faces opposite to each other;
   a retainer plate made of an elastic material and bonded to at least one of the upper and lower end faces of the wall;
   a holder assembly for holding the cleaner element, the holder assembly having a seat element which holds said at least one of the upper and lower end faces of the cleaner element through the retainer plate and being accommodated within the cleaner housing together with the cleaner element; and
   a sealing member disposed in the holder assembly and sandwiched between the retainer plate and the seat element.

10. The air cleaner for an engine as claimed in claim 9, wherein each of the retainer plate and the sealing member is made of a rubber material.

11. The air cleaner for an engine as claimed in claim 9, wherein the holder assembly includes a first holder having a tubular body formed integrally therewith and a second holder cooperable with the first holder for holding the cleaner element between it and the first holder and wherein the cleaner element is externally mounted on the tubular body.

12. The air cleaner for an engine as claimed in claim 11, wherein the second holder has the seat element defined therein and wherein the sealing member is disposed in the seat element of the second holder at a location confronting a lower end face of the tubular body of the first holder through the retainer plate.

13. The air cleaner for an engine as claimed in claim 12, wherein the seat element of the second holder has a circumferentially extending groove defined therein and the sealing member is engaged in the circumferentially extending groove.

14. The air cleaner for an engine as claimed in claim 9, wherein the cleaner element is made of an urethane foam.

15. The air cleaner for an engine as claimed in claim 9, wherein first and second retainer plates are bonded respectively to the upper and lower end faces of the cleaner element; wherein the holder assembly includes a first holder having a first seat element defined therein for holding the upper end face of the cleaner element through the first retainer plate and a second holder having a second seat element defined therein for holding the lower end face of the cleaner element through the second retainer plate and also includes a tubular body onto which the cleaner element is externally mounted; wherein first and second sealing members are sandwiched between the first seat element of the first holder and the first retainer plate and between the second seat element of the second holder and the second retainer plate, respectively: and wherein the tubular body intervenes between the first and second retainer plates.

* * * * *